US010568300B1

(12) United States Patent
Qamar et al.

(10) Patent No.: US 10,568,300 B1
(45) Date of Patent: Feb. 25, 2020

(54) TESTING CHAMBER FOR LABORATORY ANIMALS

(71) Applicant: KING SAUD UNIVERSITY, Riyadh (SA)

(72) Inventors: Wajhul Qamar, Riyadh (SA); Mohammad A. Altamimi, Riyadh (SA)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 16/376,737

(22) Filed: Apr. 5, 2019

(51) Int. Cl.
*A01K 1/03* (2006.01)
*A01K 1/035* (2006.01)

(52) U.S. Cl.
CPC ............ *A01K 1/031* (2013.01); *A01K 1/0356* (2013.01)

(58) Field of Classification Search
CPC . A01K 1/031; A01K 1/03; A01K 1/02; A01K 1/035
See application file for complete search history.

(56) References Cited

U.S. PATENT DOCUMENTS

| | | | | |
|---|---|---|---|---|
| 2,725,036 A | * | 11/1955 | Petrie | A01K 1/03 119/472 |
| 2,821,165 A | * | 1/1958 | Wright | A01K 1/033 119/482 |
| 3,540,413 A | | 11/1970 | Castaigne | |
| 3,830,201 A | | 8/1974 | Coulbourn | |
| 4,337,726 A | | 7/1982 | Czekajewski et al. | |
| 4,968,974 A | | 11/1990 | Sakano | |
| 5,078,094 A | * | 1/1992 | Hoover | A01K 1/031 119/174 |
| 5,915,332 A | | 6/1999 | Young et al. | |
| 6,267,080 B1 | * | 7/2001 | Roy | A01K 1/02 119/453 |
| 7,389,744 B2 | | 6/2008 | Zhang et al. | |
| 7,882,135 B2 | | 2/2011 | Brunner et al. | |
| 9,107,385 B2 | * | 8/2015 | Lever | A01K 1/03 |
| 2016/0120153 A1 | | 5/2016 | Iriki et al. | |

FOREIGN PATENT DOCUMENTS

DE         2149090 A1      4/1973

OTHER PUBLICATIONS

Castelhano-Carlos et al., "PhenoWorld: a new paradigm to screen rodent behavior," Translational Psychiatry; Jun. 2014; 4(6): e399, Published online Jun. 10, 2014.

* cited by examiner

*Primary Examiner* — Kristen C Hayes
(74) *Attorney, Agent, or Firm* — Richard C. Litman; Nath, Goldberg & Meyer

(57) ABSTRACT

The testing chamber for laboratory animals includes multiple testing points to provide multiple tests and testing zones within the same chamber. The testing chamber for laboratory animals provides for study, testing and assessment of cognitive and motor skills of laboratory test subjects, such as mice, rats and the like. The multiple tests performed within the testing chamber may be used for an overall characterization of the neurobehavioral activities of the test animals. The testing chamber for laboratory animals includes a housing divided into first and second zones. A beam for balance beam-style travel from the first zone to the second zone is provided. A volume of water may be contained in the first zone, and the second zone may contain platforms and ramps for the laboratory animal to travel over. A passage from the first zone to the second zone may be further provided.

14 Claims, 1 Drawing Sheet

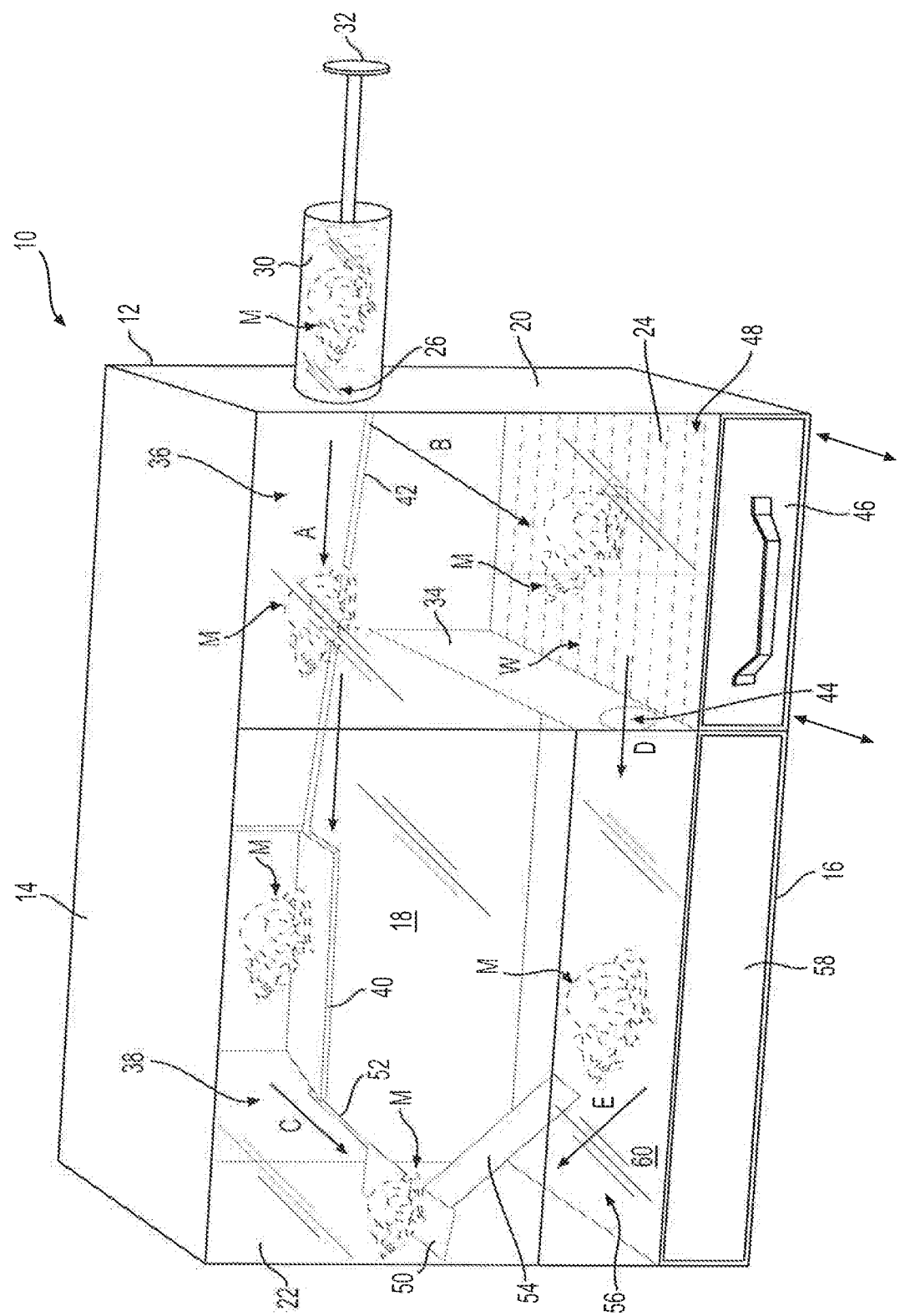

US 10,568,300 B1

TESTING CHAMBER FOR LABORATORY ANIMALS

BACKGROUND

1. Field

The disclosure of the present patent application relates to the laboratory study and testing of animals, such as mice, rats and the like, and particularly to a testing chamber for studying, testing and characterizing the neurobehavioral activities of the animals.

2. Description of the Related Art

Animal test cages, chambers and the like have been used for a wide variety of laboratory animals, such as various types of rodents, for example, for testing psychological, neurological, behavioral, cognitive and physiological traits and abilities. Typical test cages and the like are commonly designed not only for a singular type of testing animal, but for a singular purpose. For example, a typical test cage or chamber may be provided in the form of a maze. If an additional test is desired, another test cage is built or acquired, and this second test cage may be, for example, designed for a forced swim test. For each additional test of the animal, a new specialized testing cage must be purchased or built.

Additionally, in such animal testing, the testing of cognitive abilities is often studied separately from the testing of motor skills. Thus, if one desires to study more than one aspect of a particular animal's neurobehavioral characteristics, even more test cages and equipment must be added. It would obviously be desirable to integrate multiple types of tests into a single testing chamber for laboratory test subjects. Thus, a testing chamber for laboratory animals solving the aforementioned problems is desired.

SUMMARY

The testing chamber for laboratory animals includes multiple testing points to provide multiple tests and testing zones within the same chamber. The testing chamber for laboratory animals provides for study, testing and assessment of cognitive and motor skills of laboratory test subjects, such as mice, rats and the like. The multiple tests performed within the testing chamber may be used for an overall characterization of the neurobehavioral activities of the test animals. The testing chamber for laboratory animals includes a housing having opposed top and bottom walls, laterally opposed first and second side walls, and opposed front and rear walls. An inlet is formed through the first side wall for providing passage of a laboratory animal into an interior region of the housing.

An internal wall partially separates laterally opposed first and second zones of the interior region of the housing. The inlet is formed through the first side wall and leads into the first zone of the interior region. An opening is formed through the internal wall for providing passage of the laboratory animal between the first zone and the second zone.

A first platform is mounted in the second zone of the interior region. The first platform is spaced apart from, and adjacent to, the top wall of the housing. A beam is also mounted in the interior region of the housing and extends between the inlet and the first platform, providing a balance-beam type route between the inlet and the first platform. A first ramp connects the first platform to a second platform, which is mounted to the second side wall, within the second zone of the interior region, at a height lower than that of the first platform.

A second ramp is connected to the second platform and leads downwardly therefrom into a lower portion of the second zone of the interior region. A raised floor may be received within a lower portion of the second zone, and the second ramp connects the second platform to an upper surface of the raised floor. A lower portion of the first zone may be adapted for receiving a volume of water. The water may be contained within a sliding drawer, which selectively slides in and out of the front wall of the housing, for emptying and refilling thereof. The opening formed through the internal wall provides passage for the laboratory animal between the lower portion of the first zone and the upper surface of the raised floor in the second zone.

In use, a point-based scoring system may be used to assess the laboratory animal's performance. For example, if the laboratory animal successfully travels from the inlet, across the beam to the first platform, and down the first ramp to the second platform, an exemplary score of 25 points may be recorded. If, however, the laboratory animal falls from the beam into the water contained in the first zone, but then leaves the water by traveling through the opening in the internal wall, and entering the second zone to travel up the second ramp to the second platform, an exemplary score of 20 points may be recorded. As a further example, if the laboratory animal successfully travels just from the inlet and across the beam to the first platform, an exemplary score of 15 points may be recorded. If, however, the laboratory animal again falls from the beam, into the water, but travels just through the opening in the internal wall into the second zone, an exemplary score of 10 points may be recorded. If the laboratory animal at least partially travels over the beam, at least leaving the first zone, an exemplary score of 5 points may be recorded. As a final example, if the laboratory animal simply falls from the beam into the water with no further progress, an exemplary score of zero points may be recorded. As a non-limiting example, such scoring may be applied during testing of the neurotoxic effects of drugs and chemicals, such as those known to affect, or suspected of affecting, the central nervous system.

These and other features of the present disclosure will become readily apparent upon further review of the following specification and drawings.

BRIEF DESCRIPTION OF THE DRAWINGS

The sole drawing FIGURE is a perspective view of a testing chamber for laboratory animals.

Similar reference characters denote corresponding features consistently throughout the attached drawings.

DETAILED DESCRIPTION OF THE PREFERRED EMBODIMENTS

The testing chamber for laboratory animals 10 includes multiple testing points to provide multiple tests and testing zones within the same chamber. The testing chamber for laboratory animals 10 provides for study, testing and assessment of cognitive and motor skills of laboratory test subjects, such as mice, rats and the like. It should be understood that the mouse M shown in the sole drawing FIGURE is shown for exemplary purposes only. The multiple tests performed within the testing chamber 10 may be used for an overall characterization of the neurobehavioral activities of the test animals. As shown in the sole drawing FIGURE, the testing chamber for laboratory animals 10 includes a housing 12 having opposed top and bottom walls 14, 16, laterally opposed first and second side walls 20, 22, and opposed rear and front walls 18, 24. In an embodiment, at least one of the top and bottom walls 14, 16, the first and second side walls 20, 22, and rear and front walls 18, 24 is transparent. It should be understood that the overall contouring and relative dimensions of housing 12 are shown for exemplary purposes only.

An inlet 26 is formed through the first side wall 20 for providing passage of a laboratory animal (i.e., exemplary mouse M) into an interior region of housing 12. As is common in animal testing cages and the like, an entry chamber 30 may be mounted to the first side wall 20. The entry chamber 30 covers, and is in open communication with, the inlet 26. As shown, the entry chamber 30 may be configured as a cylindrical shell, allowing for slidable insertion of a plunger 32 for selectively urging the laboratory animal M to pass through inlet 26.

As shown, an internal wall 34 partially separates laterally opposed first and second zones 36, 38, respectively, of the interior region of housing 12. The inlet 26 is formed through the first side wall 20 and leads into first zone 36. An opening 44 is formed through the internal wall 34 for providing passage of the laboratory animal M between the first zone 36 and the second zone 38. As shown, the front wall 24 may be partially open, providing access to the interior of housing 12. In the non-limiting example of the sole drawing FIGURE, the front wall 24 is shown as being substantially L-shaped, resulting in first zone 36 being entirely covered, but leaving the upper portion of second zone 38 uncovered. As will be described in greater detail below, water may be received in a lower portion 48 of the first zone 36, thus the full covering of the first zone 36 prevents accidental splashes or leakage.

A first platform 40 is mounted in the second zone 38 of the interior region. As shown, the first platform 40 is spaced apart from, and adjacent to, the top wall 14 of housing 12. A beam 42 is also mounted in the interior region of the housing 12 and extends between the inlet 26 and the first platform 40, providing a balance-beam type route between the inlet 26 and the first platform 40. A first ramp 52 connects the first platform 40 to a second platform 50, which is mounted to the second side wall 22, within the second zone 38 of the interior region, at a height lower than that of the first platform 40. A second ramp 54 is connected to the second platform 50 and leads downwardly therefrom into a lower portion 56 of the second zone 38. It should be understood that the overall shape and relative dimensions of beam 42, first platform 40 and second platform 50 are shown for exemplary purposes only.

A raised floor 58 may be received within a lower portion 56 of the second zone 38, as shown, with the second ramp 54 connecting the second platform 50 to an upper surface 60 of the raised floor 58. As noted above, the lower portion 48 of the first zone 36 may be adapted for receiving a volume of water W. The water W may be contained within a sliding drawer 46, which selectively slides in and out of the front wall 24 of housing 12 for emptying and refilling thereof. The opening 44 formed through the internal wall 34 provides passage for the laboratory animal M between the lower portion 48 of the first zone 36 and the upper surface 60 of the raised floor 58 in the second zone 38.

In use, a point-based scoring system may be used to assess the laboratory animal's performance. For example, if the laboratory animal M successfully travels from the inlet 26, across the beam 42 to the first platform 40 (labeled as path A in the sole drawing FIGURE), and down the first ramp 52 to the second platform 50 (path C), an exemplary score of 25 points may be recorded. If, however, the laboratory animal M falls from the beam 42 into the water W contained in the first zone 36 (path B), but then leaves the water W by traveling through the opening 44 in the internal wall 34 (path D), and entering the second zone 38 to travel up the second ramp 54 to the second platform 50 (path E), an exemplary score of 20 points may be recorded. As a further example, if the laboratory animal M successfully travels just from the inlet 26 and across the beam 42 to the first platform 40 (path A), an exemplary score of 15 points may be recorded. If, however, the laboratory animal M again falls from the beam 42, into the water W (path B), but travels just through the opening 44 in the internal wall 34 into the second zone 38 (path D), an exemplary score of 10 points may be recorded. If the laboratory animal M at least partially travels over the beam 42, at least leaving the first zone 36, an exemplary score of 5 points may be recorded. As a final example, if the laboratory animal M simply falls from the beam 42 into the water W with no further progress, an exemplary score of zero points may be recorded. As a non-limiting example, such scoring may be applied during testing of the neurotoxic effects of drugs and chemicals, such as those known to affect, or suspected of affecting, the central nervous system.

It is to be understood that the testing chamber for laboratory animals is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A testing chamber for laboratory animals, comprising:
   a housing having opposed top and bottom walls, laterally opposed first and second side walls, and opposed front and rear walls, an inlet defined through the first side wall for providing passage of a laboratory animal into an interior region of the housing;
   an internal wall partially separating laterally opposed first and second zones of the interior region of the housing, the inlet formed through the first side wall leading into the first zone of the interior region, an opening being formed through the internal wall for providing passage of the laboratory animal between the first zone and the second zone;
   a first platform mounted in the second zone of the interior region, the first platform being spaced apart from, and adjacent to, the top wall of the housing;
   a beam mounted in the interior region of the housing, the beam extending between the inlet and the first platform;
   a second platform mounted to the second side wall within the second zone of the interior region;
   a first ramp connecting the first platform to the second platform;
   a second ramp connected to the second platform and leading downwardly therefrom into a lower portion of the second zone of the interior region; and
   an entry chamber mounted to the first side wall, the entry chamber covering and being in open communication with the inlet.

2. The testing chamber for laboratory animals as recited in claim 1, wherein the entry chamber comprises a cylindrical shell.

3. The testing chamber for laboratory animals as recited in claim 2, further comprising a plunger partially slidably received within the entry chamber for selectively urging the laboratory animal to pass through the inlet.

4. The testing chamber for laboratory animals as recited in claim 1, wherein the front wall is partially open.

5. The testing chamber for laboratory animals as recited in claim 4, wherein the front wall is L-shaped.

6. The testing chamber for laboratory animals as recited in claim 1, further comprising a sliding drawer for providing selective access to the lower portion of the first zone.

7. The testing chamber for laboratory animals as recited in claim 1, further comprising a raised floor received within the lower portion of the second zone of the interior region.

8. The testing chamber for laboratory animals as recited in claim 7, wherein the second ramp connects the second platform to an upper surface of the raised floor.

9. The testing chamber for laboratory animals as recited in claim 1, wherein a height of the second platform is lower than a height of the first platform.

10. A testing chamber for studying, testing and characterizing the neurobehavioral activities of laboratory animals, consisting of:
- a housing having opposed top and bottom walls, laterally opposed first and second side walls, and opposed front and rear walls, a single inlet being formed through the first side wall for providing passage of a laboratory animal into an interior region of the housing and defining a first pathway, wherein the single inlet includes an entry chamber mounted to the first side wall, the entry chamber covering and being in open communication with the single inlet;
- an internal wall partially separating laterally opposed first and second zones of the interior region of the housing, the inlet formed through the first side wall leading into the first zone of the interior region, a single opening being formed through the internal wall for providing passage of the laboratory animal between the first zone and the second zone and defining a second pathway;
- a raised floor received within a lower portion of the second zone of the interior region, wherein the raised floor is above the floor of the lower portion of the first zone, further wherein the lower portion of the first zone includes a sliding drawer for providing selective access thereto;
- a first platform mounted in the second zone of the interior region, the first platform being spaced apart from, and adjacent to, the top wall of the housing;
- a beam mounted in the interior region of the housing, the beam extending between the single inlet and the first platform and defining a third pathway;
- a second platform mounted to the second side wall within the second zone of the interior region;
- a first ramp connecting the first platform to the second platform and defining a fourth pathway; and
- a second ramp connecting the second platform to an upper surface of the raised floor and defining a fifth pathway,
- whereby the cognitive and motor abilities of the laboratory animals can be studied as they move through the five pathways.

11. The testing chamber for laboratory animals as recited in claim 10, wherein the entry chamber comprises a cylindrical shell.

12. The testing chamber for laboratory animals as recited in claim 11, further comprising a plunger partially slidably received within the entry chamber for selectively urging the laboratory animal to pass through the inlet.

13. The testing chamber for laboratory animals as recited in claim 10, wherein the front wall is partially open.

14. The testing chamber for laboratory animals as recited in claim 13, wherein the front wall is L-shaped.

* * * * *